Dec. 8, 1953  G. A. TINNERMAN  2,661,821
FASTENER
Filed Dec. 3, 1948

Inventor
GEORGE A. TINNERMAN
By
H. G. Lombard
ATTORNEY

Patented Dec. 8, 1953

2,661,821

UNITED STATES PATENT OFFICE 2,661,821

FASTENER

George A. Tinnerman, Cleveland, Ohio, assignor to Tinnerman Products, Inc., Cleveland, Ohio, a corporation of Ohio Application December 3, 1948, Serial No. 63,387

4 Claims. (Cl. 189—36)

This invention relates in general to improvements in the fabrication of metallic structures and deals, more particularly, with an improved joint construction and fastening means therefor which is adapted for a wide range and variety of applications and uses in what are known as blind locations wherein only one side of a member to be secured is conveniently or readily accessible for the application of fastening means for securing such member to another member of the installation.

Many assemblies embody a member having an angular corner portion resembling a bracket area or the like to which it is necessary to secure another part of the assembly. Frequently the interior of the corner of the bracket area or other angular part is enclosed or concealed by other parts of the installation and it is therefore necessary to use a fastening means which can be applied and secured in such corner area by an operation taking place entirely from the outer, readily accessible side of the assembly.

A primary purpose of the invention, therefore, is to provide an improved fastening construction and arrangement for a corner joint or the like and a clip or fastener therefor which is adapted to be easily and quickly applied to fastening position at the interior of a corner area of a structural member or part and retained in such fastening position against inadvertent disconnection or accidental removal without the use of extraneous bolts, screws, rivets, welding, or the like attaching means.

Another principal object of the invention is to provide such a corner joint construction and a fastener therefor which is adapted to be applied to interlocked fastening position at the inner side of the corner area by an operation taking place entirely from the forward side thereof, the fastening device comprising, generally speaking, an angular bracket type fastener body which is applied through an assembling opening in the corner area and secured in substantially locked relation therewith by a snap fastening action by which the fastener is fixedly and rigidly retained in said corner area in position to receive a threaded fastener for securing a cooperating part or member thereto.

A further object of the invention is to provide a clip or fastener of the kind described having an improved form of attaching means comprising an attaching spring finger or spring arm adapted to cooperate with means on the bracket type fastener body to hold the fastener in fastening position at the rearward side of the corner area incidental to an assembling operation taking place entirely from the forward or outer side of the corner area.

An additional object of the invention is to provide a corner fastener of this character having a locking detent adapted to cooperate with the attaching spring arm in engagement with an edge of an assembling opening in the corner area to lock the fastener in applied position and prevent retrograde movement and inadvertent disconnection or displacement thereof from such applied fastening position.

Further objects and advantages, and other new and useful features in the construction, arrangement and general combination of parts of the invention will be readily apparent as the following description proceeds with reference to the accompanying drawings, for purposes of illustration but not of limitation, in which like reference characters designate like parts throughout, and in which.

Figure 4:
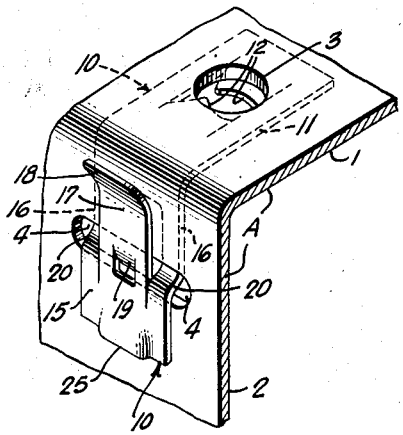
Fig. 4 is a perspective view showing the fastener in attached position on the apertured corner area of a bracket or other corner member.
Figure 5:
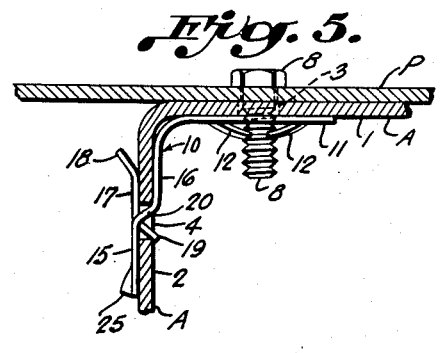
Figure 6:
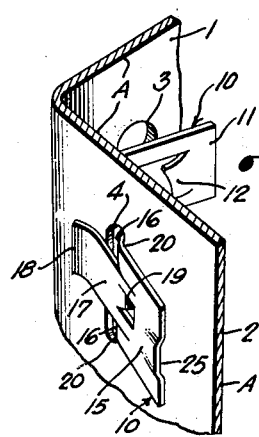

Fig. 5 is a sectional view showing the fastener as attached to the corner area of a bracket or other corner member and illustrates the securing of a cooperating part thereto by a bolt or screw applied to the thread engaging means of the fastener; and, Fig. 6 is another perspective view showing the fastener as initially applied through the assembling opening in the corner area prior to the final step of seating and locking the fastener in fully attached position as illustrated in Fig. 4.

Referring now, more particularly, to the drawings, it will be understood that the improved fastening device of the invention is one of general utility and may be readily designed in any size and gauge for use in various installations in proportion to the size and contour of the parts secured. The devices are particularly suited for use in providing a corner area of an apertured bracket member or other angular part of a supporting structure with means for securing a cooperating part thereto by an operation taking place entirely from the forward or outer side thereof as required in a blind location, for example. In this relation, a preferred embodiment of the invention pertains to the provision of a fastening device having screw threaded fastener receiving means together with attaching means designed to hold the fastening device in self-sustaining position on the supporting structure preparatory to the application of a threaded fastener thereto for securing a cooperating part to such supporting structure. In other installations, the fastening devices may be provided in the manner of retainers for ordinary threaded nuts used in a similar manner or other retaining means for securing a cable, rod, tube, or other object or article of manufacture to be mounted on the supporting structure in a substantially locked fastening engagement under continuously effective spring tension.

In the present example, the letter A designates generally the corner area of a bracket member or other member in a supporting structure having a corner portion defined by intersecting panel or plate-like surfaces 1 and 2. The fastener 10 comprises a generally angularly shaped device corresponding substantially to the inner contour of such corner area. The fastener is provided with bolt or screw engaging means adapted to be positioned at the rearward side of such corner area by an operation taking place entirely from the forward side thereof preparatory to the application thereto of the bolt or screw fastening 8, Fig. 5, for securing a cooperating part P to such supporting structure. The bracket or other angular member of the supporting structure A may be of any suitable sheet metal, wood, or fibre board material, or the like; however, inasmuch as the instant invention is employed mainly in metallic structures, the same is usually in the form of an angular portion or corner area of a metallic panel or plate which is provided with the necessary perforations for each fastener to be used along the path which the object or part to be secured thereto extends in mounted position thereon. These perforations for each fastener comprise a hole layout consisting of a bolt passage 3 in the surface 1 and an assembling opening or slot 4 in the other surface 2 at a point suitably spaced from said bolt passage. The assembling opening 4 may be provided either as a round hole or elongated substantially rectangular slot as shown, and in any event, is of relatively simple outline and therefore may be provided at little added cost in the same operation by which the necessary bolt passage 3 would be provided ordinarily in such a bolt or screw fastened installation. Preferably the bolt passage 3 is made of a size somewhat larger than necessary so that the threaded fastener may freely pass therethrough and be secured in any of several positions of adjustment as may be necessary or desirable.

The fastener, designated generally 10, comprises a relatively simple device having an angular design corresponding substantially to the angular formation of the inner side of the corner area of the bracket or other corner member A of the supporting structure so as to fit snugly within such corner area in applied fastening position as seen in Fig. 4. The fastener is constructed most economically from a relatively small, inexpensive blank of sheet metal which is best provided in the manner of a simple, rectangular section severed from standard sheet metal strip stock without loss or waste of material whatsoever. Any suitable sheet metal may be employed but preferably that of a spring metal nature such as spring steel or cold rolled steel having spring characteristics and otherwise of much greater tensile and compressive strength than the supporting structure A. One end of the sheet metal blank is formed as a nut or base portion 11 which extends at right angles or in other angular relationship to the remainder of the strip and is prepared with integral bolt or screw thread engaging means 12 adapted to receive a threaded bolt or screw fastening 8 for securing a cooperating part or object P in an installation such as shown in Fig. 5, for example.

The thread engaging elements 12 are provided in the sheet metal base portion 11 by an aperture intermediate spaced parallel slits which form cooperating tongues, or the like, having spaced extremities defining the desired thread or thread opening corresponding substantially to the root of the bolt or screw for threadedly engaging the thread thereof. Said tongues otherwise are preferably formed to project outwardly out of the plane of the base portion 11 and are bent lengthwise in substantial ogee formation to provide for the maximum strength obtainable to withstand the tightening action of the cooperating bolt or screw as it is tightened in fastening position.

Such thread engaging means may be pressed, stamped, extruded, or otherwise provided in any suitable form or construction so long as the same threadedly engage with the thread of the bolt or screw and, in this relation, the present invention fully contemplates the provision of such thread engaging means in various other similar and related forms, as in the manner of a keyhole type of thread opening, or a perforated protuberance which is pressed from the sheet metal and shaped to provide a helical thread or thread opening, or otherwise has the walls thereof tapped to provide a plurality of threads for threadedly engaging the bolt or screw. However, it has been found that such thread engaging means prepared in the form of cooperating, yieldable tongues as shown, are highly efficient and most practical in that they are possessed of unusual inherent serength and will not collapse or pull through when the bolt is tightened, nor loosen under continuous strain and vibration in the installation. This takes place by reason of the fact that the sheet metal material from which such tongues are formed is of less thickness than the pitch or spacing between adjacent thread convolutions on the bolt or screw, wherefore the extremities of said tongues tend, more effectively, to move toward each other and dig into the grooves intermediate adjacent thread convolutions when tightened and otherwise become embedded in the root of the bolt or screw in locked, frictional fastening engagement therewith. Thus, in the present example, the tongues 12 are shown extending outwardly out of the plane of the fastener base 11 in substantial ogee design and provided preferably with notched extremities, defining substantial biting jaws adapted to cut into the root of the bolt and the adjacent thread surfaces thereon in positive locking relation therewith in the most effective manner. There is thereby eliminated the necessity for a separate, auxiliary locking means such as a lock nut or lock washer and this, in mass production methods of assembly, makes possible a considerable saving not only in the cost of such locking devices, but also, in the expense and labor involved in the tedious, time consuming assembling operations and other added steps in manufacture which such auxiliary locking means require. It is to be understood, however, that the present invention is not limited in any manner or form to the illustrated construction of the thread engaging means but rather, comprehends also, various other similar and related forms of such tongues or equivalent thread engaging elements.

The fastener body is bent generally at right angles or other angular relationship to the base or nut portion 11 of the fastener to provide an attaching portion 15 substantially in the form of an extension to said nut portion. This attaching portion is slit and bent to define a pair of side portions 16 on either side of a reversely extending spring finger 17 which is adapted to cooperate with said side portions in clasping the part 2 adjacent the assembling opening 4 to hold the fastener in self sustained fastening position at the inner side of the corner area as shown in Fig. 4.

The spring arm 17 is provided with an outwardly flared tongue 18 on its extremity which serves both as a stop for locating the fastener and as a cam surface for facilitating outward flexing of said spring arm as the fastener is applied to attached fastening position, as presently to be described. A locking lug 19 is stamped from the intermediate area of the spring arm adjacent the junction thereof with the fastener body. Said locking lug 19 is bent to project from the body portion 15 on the side opposite that on which the spring arm 17 is disposed and is inclined in a reversely extending direction so that the extremity thereof defines a shoulder adapted to engage an adjacent wall of the assembling opening 4. The side portions 16 are formed adjacent the junction of the spring arm 17 to the body portion 15 with an offset 20 of a size sufficient to accommodate the thickness of the support A so that said side portions 16 cooperate with the spring arm 17 in resiliently engaging opposite surfaces of the support adjacent the assembling opening 4 as best seen in Figs. 4 and 5. In this relation, the offsets 20 in said side portions define shoulders adapted to engage the wall of the assembling opening 4 at spaced points in cooperation with the resilient locking lug 19 to retain the fastener in applied fastening position.

The body of the fastening device is provided in a width corresponding to or slightly less than the length of the assembling slot 4 so as to permit the nut portion 11 to pass therethrough but only to the extent limited by the outwardly flared tongue 18 on the spring arm, inasmuch as said tongue projects outwardly from the side portions 16 a distance greater than the width of said assembling opening 4. The end of the attaching portion 15 is preferably bent into an outward boss 25 which defines a pronounced projection for the application of hammer blows to advance the fastener to attached position while the inner surface of said boss provides a recess for receiving a tool, such as a screw driver or other pointed implement, which is suitable for wedging the attaching portion 15 of the fastener outwardly from the adjacent surface 2 as required to release the fastener from attached position whenever removal thereof may be required.

Figure 1:
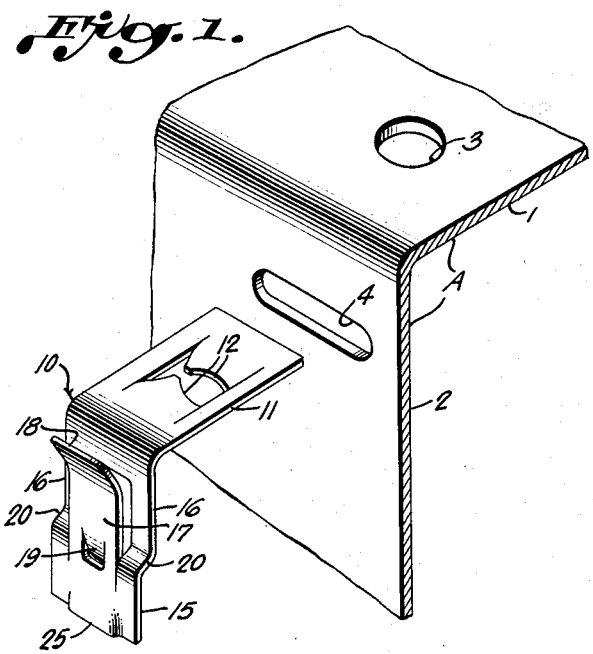
Fig. 1 is a perspective view showing a fastener provided in accordance with the invention as located in position for application to attached fastening position on an apertured corner area of a bracket member or other structural part.
Figure 2:
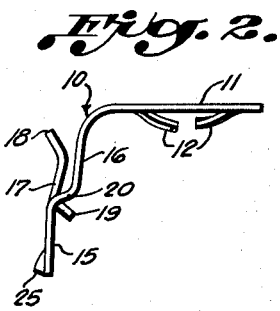
Fig. 2 is an edge elevational view of the fastener per se shown in Fig. 1.
Figure 3:
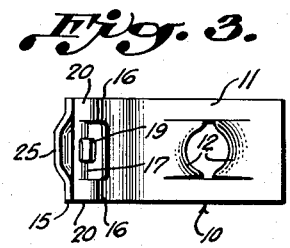
Fig. 3 is a bottom plan view of Fig. 2.

With the fastener thus provided and the bracket member or other corner area of a supporting part prepared with a bolt passage 3 and assembling opening 4 as shown in Fig. 1, the nut portion 11 of the fastener is easily and quickly applied entirely from outside of said support to positively locked assembled position at the inner or rearward side of such corner area simply by inserting said base or nut portion 11 through the assembling slot 4 and advancing the fastener lengthwise of said base portion until limited, as seen in Fig. 6, by the attaching portion 15 and the outwardly projecting tongue 18 on the spring arm which is so provided as to prevent the fastener from passing entirely through said opening, as aforesaid. The attaching portion 15 of the fastener is then pushed in the direction of the free end of the spring arm 17 toward the position for disposing the base portion 11 against the inner side of the surface 1 with the thread engaging means 12 aligned with the bolt passage 3 therein. During this final movement of the fastener to attached position, the tongue 18 on the spring arm serves as a cam surface bearing on the surface 2 to cause said spring arm to flex and yield outwardly as necessary to permit the locking lug 19 to enter the assembling opening 4 and pass therethrough to a position in which the extremity of said locking lug snaps into positive abutting engagement with the adjacent edge or wall portion of said assembling opening. This is usually accomplished in a quick and expeditious manner by the application of hammer blows to the extremity of the boss or projection 25 which causes a simultaneous outward flexing of the spring arm 17 and the forward movement of the fastener necessary to permit said locking lug 19 to enter the assembling opening and seat in locked position therein, as stated. In such locked position, the shoulders defined by the offsets 20 in the side portions 16 of the body portion 15 serve as abutments which engage the adjacent wall or edge of the assembling slot 4 while the locking lug 19 engages the opposing wall or edge of said assembling slot to retain the fastener in fully applied position against lengthwise displacement or relative rotative shifting. As seen in Fig. 5, the locking lug 19 is designed for a positive locked engagement with the wall of the assembling opening 4 at the position in which the base portion 11 is in close flush engagement with the inner side of surface 1 of the corner area with the thread engaging means 12 aligned with the opening 3 therein. This arrangement eliminates any possibility of accidental displacement or reverse tilting movement of the thread engaging elements 12 from applied fastening position in alignment with the bolt passage 3 which is most important for the proper initial insertion of the bolt or screw fastening 8, Fig. 5, to threaded fastening engagement with said thread engaging elements 12. In a blind location, such substantially fixed nonrotative attachment of the fastener in self-sustained fastening position on the support is most essential inasmuch as the rearward side of the support or corner area is not readily accessible and it becomes impossible or inconvenient for a worker to hold or steady the fastener for inserting and threadedly engaging the bolt or screw fastener 8 therewith.

In the event that it becomes necessary to remove the fastener from the attached position shown in Figs. 4 and 5, this is easily and quickly accomplished simply by inserting a screw driver or other pointed tool into the recess defined by the boss 25 in order to wedge the attaching portion 15 of the fastener outwardly from the adjacent panel surface 2 as necessary to move the locking lug 19 outwardly and disengage the same from the assembling slot 4. The body of the fastener then may be tilted or canted to pull the spring arm 17 and side portions 16 from clasping engagement with the part 2 and otherwise position the base or nut portion 11 in line with the assembling opening 4 so that it may be withdrawn therefrom and the fastener removed. The fastener is not damaged or deformed by such removal and accordingly, is adapted to be readily reapplied to the same or a similar fastening location in a repetition of the foregoing described procedure.

The fastener in any form preferably is constructed of relatively thin sheet metal, the thickness of which is selected according to service requirements and the predetermined size and contour of the parts of the corner area secured. The fasteners are most effective when provided of spring metal suitably spring tempered and otherwise treated to give the desired toughness and hardness, particularly in the case of devices which are used in installations where extreme vibratory motion takes place. A cheap and highly effective fastener may be provided from cold rolled metal, such as cold rolled steel, which is untempered but of a spring metal nature and capable of providing an effective and reliable fastening means.

While the invention has been described in detail with a specific example, such example is intended as an illustration only inasmuch as various changes in the construction and arrangement of the clips or fasteners within the broad scope of the instant disclosure are fully contemplated.

What is claimed is:

1. A fastener adapted to be attached to a part provided with a bolt passage and an attaching opening, said fastener comprising a piece of sheet metal providing a portion carrying bolt or screw engaging means and an attaching portion adapted to pass through said attaching opening from the outer surface of said part and engage the inner surface of said part adjacent said opening with said bolt or screw engaging means aligned with said bolt passage in said part, a cooperating resilient arm stamped from said attaching portion between side sections thereof and extending in resilient relation to said attaching portion in position for engaging the outer surface of said part adjacent said opening in cooperation with said attaching portion to retain the fastener in attached position, shoulders on said side sections of said attaching portion engageable with an edge portion of said opening, and a lug provided on said resilient arm extending inwardly from said arm and adapted to engage an opposite edge portion of said opening in cooperation with said shoulders on said side sections to lock the fastener in such attached position.

2. A fastener adapted to be attached to a part provided with a bolt passage and an attaching opening, said fastener comprising a piece of sheet metal providing a portion carrying bolt or screw engaging means and an attaching portion adapted to pass through said attaching opening from the outer surface of said part and engage the inner surface of said part adjacent said opening with said bolt or screw engaging means aligned with said bolt passage in said part, a cooperating resilient arm stamped from said attaching portion between side sections thereof and extending in resilient relation to said attaching portion in position for engaging the outer surface of said part adjacent said opening in cooperation with said attaching portion to retain the fastener in attached position, shoulders on said side sections of said attaching portion engageable with an edge portion of said opening, a lug stamped in said resilient arm extending inwardly from said arm in the opposite direction from said arm and adapted to engage an opposite edge portion of said opening in cooperation with said shoulders on said side sections to lock the fastener in such attached position, and said resilient arm having an outwardly flared tongue on its free end spaced from said attaching portion a distance greater than the size of said opening to prevent said arm from passing through said opening from the outer surface of said part in the application of the fastener to attached position.

3. A fastening installation comrising a part having a corner structure provided with a fastener attaching opening in one wall of said corner structure and a bolt or screw passage in the other wall of said corner structure, and a fastener comprising a piece of sheet metal bent to provide an angular body positioned within said corner structure and including a portion carrying bolt or screw engaging means aligned with said bolt passage and engaging the inner surface of said part adjacent said bolt passage, and an attaching portion engaging the inner surface of said part adjacent said attaching opening and extending through said opening to the outer surface of said part, an arm stamped out from said attaching portion between side sections thereof, said arm engaging the outer surface of said part adjacent said opening in cooperation with said attaching portion to retain the fastener in attached position in said corner structure, shoulders on said side sections of said attaching portion engaging an edge portion of said opening, and a lug carried by said stamped out arm extending in the opposite direction from said arm and engaging an opposite edge portion of said opening to lock the fastener in such attached position.

4. A fastening installation comprising a part having a corner structure provided with a fastener attaching opening in one wall of said corner structure and a bolt or screw passage in the other wall of said corner structure, and a fastener comprising a piece of sheet metal bent to provide an angular body positioned within said corner structure and including a portion carrying bolt or screw engaging means aligned with said bolt passage and engaging the inner surface of said part adjacent said bolt passage, and an attaching portion engaging the inner surface of said part adjacent said attaching opening and extending through said opening to the outer surface of said part, an arm stamped from said attaching portion between side sections thereof, said arm engaging the outer surface of said part adjacent said opening in cooperation with said attaching portion to retain the fastener in attached position in said corner structure, shoulders on said side sections of said attaching portion engaging an edge portion of said opening, a lug carried by said stamped out arm extending inwardly in the opposite direction from said arm and engaging an opposite edge portion of said opening to lock the fastener in such attached position, and said stamped out arm having an outwardly flared tongue on its free end spaced from said attaching portion a distance greater than the size of said opening to prevent said arm from passing through said opening from the outer surface of said part in the application of the fastener.

GEORGE A. TINNERMAN.

References Cited in the file of this patent
UNITED STATES PATENTS

| Number | Name | Date |
| --- | --- | --- |
| 2,168,721 | Tinnerman | Aug. 8, 1939 |
| 2,328,757 | Tinnerman | Sept. 7, 1943 |
| 2,346,712 | Tinnerman | Apr. 18, 1944 |
| 2,384,508 | Tinnerman | Sept. 11, 1945 |
| 2,459,953 | Mills | Jan. 25, 1949 |
| 2,486,557 | Flora | Nov. 1, 1949 |